United States Patent
Goble

(10) Patent No.: US 6,958,126 B2
(45) Date of Patent: Oct. 25, 2005

(54) NON-FLAMMABLE, NON-OZONE DEPLETING REFRIGERANT MIXTURES SUITABLE FOR USE IN MINERAL OIL (GHGX9)

(76) Inventor: George H. Goble, 286 W. Navajo, West Lafayette, IN (US) 47906

( * ) Notice: Subject to any disclaimer, the term of this patent is extended or adjusted under 35 U.S.C. 154(b) by 16 days.

(21) Appl. No.: 11/010,876

(22) Filed: Dec. 13, 2004

(65) Prior Publication Data

US 2005/0156133 A1   Jul. 21, 2005

Related U.S. Application Data

(62) Division of application No. 10/603,638, filed on Jun. 25, 2003, now Pat. No. 6,863,840.

(60) Provisional application No. 60/392,294, filed on Jun. 27, 2002.

(51) Int. Cl.$^7$ .............................................. C09K 5/04
(52) U.S. Cl. ...................................................... 252/67
(58) Field of Search ..................... 252/67, 68

(56) References Cited

U.S. PATENT DOCUMENTS

| | | | |
|---|---|---|---|
| 5,616,276 A * | 4/1997 | Bivens et al. ................. | 252/67 |
| 5,736,062 A * | 4/1998 | Basile et al. .................. | 252/67 |
| 5,800,730 A | 9/1998 | Bivens et al. | |
| 5,954,995 A * | 9/1999 | Goble ........................... | 252/67 |
| 6,231,782 B1 | 5/2001 | Shimomura et al. | |
| 6,428,720 B1 | 8/2002 | Roberts | |
| 6,511,610 B2 | 1/2003 | Caron et al. | |
| 6,863,840 B2 * | 3/2005 | Goble ........................... | 252/67 |
| 6,875,370 B2 * | 4/2005 | Goble ........................... | 502/2 |
| 2002/0040975 A1 | 4/2002 | Goble | |

FOREIGN PATENT DOCUMENTS

| | | | |
|---|---|---|---|
| GB | 2327427 A | | 1/1999 |
| WO | WO 94/00529 | * | 1/1994 |
| WO | WO 97/11138 | | 3/1997 |
| WO | WO 01/23493 A1 | | 4/2001 |

* cited by examiner

Primary Examiner—John R. Hardee
(74) Attorney, Agent, or Firm—Clifford W. Browning; Woodard, Emhardt, Moriarty, McNett & Henry LLP

(57) ABSTRACT

The present invention relates to refrigerants generally, and more specifically to nonflammable, nonozone depleting, mixtures of refrigerants that may be substituted for HCFC-22, R-407C, R-417A, R-502, R-500, CFC-12, R-404A, HFC-134a, and others, and is usable in mineral oil systems. Among the most preferred embodiments of the present invention are mixtures that are substitutes for these refrigerants, comprising about 1 to 85 weight percent R-125, and about 1 to 80 weight percent R-134a, and about 0 to 12 weight percent of R-1270, R-290 or a mixture thereof, and about 1 to 15 weight percent R-E170 and about 0 to 20 weight percent R-227ea, with the weight percentages of the components being weight percentages of the overall mixture.

4 Claims, No Drawings

NON-FLAMMABLE, NON-OZONE DEPLETING REFRIGERANT MIXTURES SUITABLE FOR USE IN MINERAL OIL (GHGX9)

The present application is a divisional of U.S. application Ser. No. 10/603,638, now U.S. Pat. No. 6,863,840, filed Jun. 25, 2003, which claims the benefits of U.S. Provisional Patent Application No. 60/392,294, filed Jun. 27, 2002.

The present invention relates to refrigerants generally, and more specifically to nonflammable, nonozone depleting, mixtures of refrigerants that may be substituted for HCFC-22, R-407C, R-417A, R-502, R-500, CFC-12, R-404A, HFC-134a, and others, and is usable in mineral oil systems.

BACKGROUND OF THE INVENTION

In order to provide a more compact format for identifying mixtures of refrigerants in the following discussions, mixtures of refrigerants will be listed in the form of:

| R-ABC/DEF/GHI | (N0/N1/N2) |
|---|---|
| or | |
| R-ABC/DEF/GHI | (N0–N0'/N1–N1'/N2–N2') | which represents a mixture of refrigerants (fluids) R-ABC, R-DEF, and R-GHI where N0, N1, and N2 are the weight percentages of each component fluid. The second form is similar, but specifies ranges of weight percentages of each of the component fluids, with the total being 100 percent. For this application, the following Table 1 discloses some refrigerant R-numbers referenced in this discussion along with their chemical names.

TABLE 1

| R-number | Chemical name |
|---|---|
| R-12 | dichlorodifluoromethane |
| R-22 | chlorodifluoromethane |
| R-32 | difluoromethane |
| R-124 | chlorotetrafluoroethane |
| R-134a | 1,1,1,2-tetrafluoroethane |
| R-134 | 1,1,2,2-tetrafluoroethane |
| R-142b | 1-chloro-1,1-difluoroethane |
| R-600 | n-butane (n-C4H10) |
| R-600a | isobutane (i-C4H10) or i-butane |
| R-601 | n-pentane (n-C5H12) |
| R-601a | isopentane (i-C5H12) or i-pentane |
| R-1270 | propylene |
| R-227ea | 1,1,1,2,3,3,3-heptafluoropropane |
| R-125 | pentafluoroethane |
| R-290 | propane |
| R-C270 | cyclopropane |
| R-E170 | dimethyl ether (DME) |
| R-152a | 1,1-difluoroethane |
| R-115 | chloropentafluoroethane |
| R-143a | 1,1,1-trifluoroethane |
| R-218 | octafluoropropane |
| R-500 | R-12/152a (73.8/26.2) |
| R-502 | R-22/115 (48.8/51.2) |
| R-413A | R-218/134a/600a (9/88/3) |
| R-414A | R-22/142b/124/600a (51.0/16.5/28.5/4.0) |
| R-404A | R-125/143a/134a (44/52/4) |
| R-407C | R-32/125/134a (23/25/52) |
| R-417A | R-125/134a/600 (46.6/50.0/3.4) |

The US Environmental Protection Agency and other world scientific bodies have determined that refrigerants comprised of chlorofluorocarbons (CFCs) cause harm to the Earth's stratospheric ozone layer after being released into the atmosphere. Hydrochlorofluorocarbons (HCFCs), which are chlorofluorocarbons containing one or more hydrogen atoms, also cause damage to the ozone layer, although much less so, and often twenty times less than CFCs. Various rules, regulations, protocols and treaties in the world have phased out CFCs, or are now doing so. HCFCs are being allowed as "transistion" substances between CFCs and zero ozone depletion alternatives under development. HCFCs are also under phase outs, but on a much longer time scale than the CFCs, with the final HCFC phaseout being in the year 2030. Certain countries may phase out HCFCs earlier than 2030, and certain categories of use (e.g., production of new equipment containing HCFCs) may be phased out earlier, as well, while other categories of use (service fluids for repair of existing equipment) may be maintained until 2030.

Several non-ozone depleting refrigerants have already been developed in the prior art. However, all of them have one or more drawbacks. The main drawback is that refrigerants comprised of hydrofluorocarbons (HFCs), or mixtures thereof, do not mix (are not miscible in) mineral oils used for the earlier CFC and HCFC refrigerants (e.g., CFC-12 and HCFC-22, R-502, R-500). R-407C, comprised of R-32/125/134a (23/25/52), closely matches the pressure temperature curve of HCFC-22. However, it requires ester (POE) oil and is totally non-miscible in mineral oil. Ester oils are far more expensive and are less stable than mineral oils. Ester oils also are far more hygroscopic than mineral oils, so moisture can enter a refrigeration system much easier during manufacture or service than it can with mineral oils. This moisture is extremely damaging, and causes the refrigerants to slowly hydrolyze and decompose into hydrofluoric acid (HF) and other components leading to early system failures.

Steel is a catalyst that can make some ester refrigeration oils decompose back to their components of formation, namely alcohols and fatty acids. Ester oil manufacturers often add proprietary "passivators" to prevent the breakdown of their ester oils. Passivators can sometimes wear out or be consumed in long term operation (i.e., years), thus leading to oil failure. Mineral (or alkylbenzene) oils are inherently stable over the long term in properly operating refrigeration systems, often lasting 30–40 years or more.

U.S. Pat. No. 5,688,432 to Pearson teaches an R-22 substitute consisting of a mixture of R-125, R-134a, and a hydrocarbon selected from the group consisting of propane and isobutane. The '432 patent's Summary of Invention section mentions "(iii) a hydrocarbon selected from isobutane, propane and mixtures thereof." All examples and claims only show isobutane for the hydrocarbon, no propane or "mixtures thereof" are taught for the use as the hydrocarbon in this mixture. The '432 patent claims greater than zero and a maximum 11 weight percent of isobutane and that the resulting mixture is "nonflammable". The definition of "flammable" when applied to pass a UL2182 test to qualify for an ASHRAE classification (flammability) of group 1 will only permit about 3 weight percent maximum isobutane in these mixtures. The UL2182 standard requires fractionation of the mixture at various temperatures. Vapor and liquid samples taken during the fractionations are then flammability tested to make sure no regions of flammability occur. Before ignition, the gas/air mixtures are preheated to 100° C. (for the "as formulated" mixture) and 60° C. (for the worst case fractionations). In addition, "worst case manufacturing tolerances," where the nominal mixture has all flammable components increased by 0.5 weight percent and nonflammable components decreased by 0.5 weight percent, are used instead of the nominal mixture. Nowhere does the '432 patent teach breaking up the hydrocarbons between isobutane and propane to better distribute the flammable components among the nonflammable components in order allow the weight percentages of the flammable components to be increased. A formulation of R-125, R-134a, which contained 8–11 weight percent isobutane would return mineral oil very well to the compressor and indeed may be nonflammable "as formulated," however, it certainly becomes flammable during fractionation and elevated ignition preheat temperatures as specified under UL2182, thus limiting the maximum isobutane to about 3 weight percent, which is not enough to return mineral oil in all cases. It may suffice in window A/C units with short suction lines, but may not work in systems with long or uphill refrigerant lines, such as found in rooftop units or units running "unloaded" with low suction gas velocities.

Also, in the prior art is R-417A (Rhodia ISCEON 59), comprised of R-125/134a/600 (46.6/50.0/3.4), which contains a hydrocarbon in an attempt to carry the mineral oil. While this refrigerant will work in systems that circulate very little mineral oil, or have short refrigerant return lines to the compressor, such as window A/C units, it might not always be able to return the mineral oil to the compressor in long piping runs as often found in super market or rooftop air conditioner installations.

In 1995, Applicant built an "oil miscibility" test stand used in the development of R-414A [R-22/142b/124/600a (51/16.5/28.5/4)] (U.S. Pat. No. 5,151,207 and other co-pending applications). This simulated worst case oil return for developing R-12 substitutes at the time. Applicant ran a mixture of 5 weight percent isobutane, 95 weight percent R134a in mineral oil and noted that there was almost zero oil return. (R-134a has zero miscibility in mineral oil). Also the "liquid line" side of the system with this mixture looked like "milk," white opaque, in the sight glass, which signified that an "oil dispersion" of tiny droplets of mineral oil still existed in the high pressure side of this system, a sign that all of the circulating oil was not dissolving into the refrigerant mixture. If all the oil had dissolved in the refrigerant, the sight glass would have been clear. R-417A operates at significantly lower pressures than does R-22, thereby causing a capacity loss on the order of 15–30 weight percent, especially in systems with fixed refrigerant metering devices (capillary tubes).

R-417A is ASHRAE safety classified as A1 and is covered by UK patent GB2327427 to Roberts (and now U.S. Pat. No. 6,428,720). Roberts teaches that flammability during fractionation can be reduced by substituting n-butane for isobutane, for n-butane boils at about 31° F. verses about 10° F. for isobutane at 1 atmosphere (ATM) pressure. Roberts goes on to teach and claim that adding higher boiling point hydrocarbons (from C4 and greater, excluding isobutane) also reduce vapor flammability during fractionation (e.g., isopentane, pentane, etc.).

Another mixture in the prior art, very similar to R-417A, is available as a commercial product designated RS-44. RS-44 consists of R-125/134a/600/601a (50/4712.51.5) and is disclosed in International Application No. PCT/GB00/03725, International Publication No. WO 01/23493 A1, of inventors Richard Powell, et al. In a similar fashion, Powell et al. also teach the addition of higher order hydrocarbons (n-butane, isopentane in RS-44) to reduce flammability (lower HC vapor pressure component). Roberts (R-417A) and Powell et al. (RS-44) both teach that their mixtures of gasses do properly return mineral oil to the compressor. However, nothing is taught about mineral oil return under partial load conditions or with commercial systems that have "unloaders" that reduce return gas velocity in the suction line. An unloader is a method by which some commercial HVAC systems use to modulate compressor capacity to track the refrigeration load. Unloaders may include turning off one or more compressors in a rack of paralleled compressors, disabling one or more cylinders in a piston compressor, usually by forcing some valves not to operate. Vanes or valves may be used to restrict the suction line and newer systems may use variable frequency (inverters) drives to vary the speed of the compressor motor. All unloader methods cause a reduction (commonly to ½) of the suction gas velocity. Reducing the suction gas velocity makes it more difficult to return mineral oil to the compressor. No prior art has been found that addresses mineral oil return under reduced suction gas velocities with chlorine free nonflammable alternative refrigerants. Unlike R-417A, RS-44 closely matches R-22 in pressures and capacity.

It has also been noted that industry in the US "requires" that refrigerants for almost all applications must have passed a UL2182 flammability test and must have an ASHRAE safety designation of "A1" (nonflammable, even after worst case fractionation, and lower toxicity group).

Adding high boiling point hydrocarbons to refrigerant blends to pass the UL flammability test seems to work, but even n-butane, boiling at +31° F. (at one ATM), will largely tend to stay dissolved in the bulk of the oil in the compressor crankcase (which is often at 5 ATM pressure in R-22 class systems) and may not vaporize in the suction line or the compressor crankcase, so much of it will not circulate in the refrigerant stream to the evaporator where it is needed to help return the mineral oil to the compressor. Isopentane and n-pentane are even worse in this respect. Moreover, if one has a "leaky" system, which needs recharging often, n-butane, isopentane, or pentane will tend to just build up in the oil with each successive recharge, and may eventually thin the oil out enough to interfere with proper compressor lubrication. One may then have a "flammability" problem when replacing the failed compressor due to the excessive amount of pentanes/butanes remaining in the compressor oil.

The boiling points (in order) of isobutane, n-butane, isopentane, n-pentane at 1 ATM are about 11° F., 31° F., 82° F., and 97° F. With conventional hermetic piston or scroll compressors, the "crankcase" operates at the low side (suction line) pressure, which is typically about 60 PSIG (75 PSIA) on an R-22 air conditioning system. At this pressure, the boiling points of the above hydrocarbons become (in order) 102° F., 124° F., 185° F., and 201° F. Crankcase temperatures on the above compressors are typically in the 90° F. thru 110° F. range, high enough such that isobutane and maybe even some n-butane will probably stay boiled out of the crankcase oil. Boiling at 185° F. and 201° F., the pentanes are much more likely to stay dissolved in the mineral oil in a crankcase operating at 90–110° F., thus they will tend to just thin out the crankcase oil a little instead of circulating with the refrigerant. Rolling piston and rotary vane compressors, often called "rotaries," which are commonly used in small to medium sized window A/C units have the crankcase at the discharge (high) pressure side, so the pentanes are even MORE likely to just stay dissolved in the crankcase oil than on compressors with the crankcase on the suction side.

Published U.S. patent application Ser. No. 2002/0050583 to Caron et al., discloses mixtures of R-125, R-134a, and dimethyl ether (DME) to act as a replacement for R-22 in mineral oil. Caron et al. teaches that 3.5 to 25 weight percent of DME is needed to provide proper return of the mineral oil.

Nothing is mentioned about flammability. Caron et al. also has claims in the range of 5 to 8 weight percent DME (preferred) as being needed to return mineral oil properly. They do not teach about the extent of mineral oil return, whether it be short runs such as in a window A/C unit, or long runs such as in a rooftop or supermarket unit with tough oil return problems. In Applicant's tests, 5 weight percent DME in this mixture would definitely be flammable and not pass a UL 2182 test by itself. Although being flammable under a UL2182 test, 5 to 8 weight percent of DME would definitely offer excellent mineral oil return in an R-22 replacement, even under reduced suction gas velocities (from unloaders) based on Applicant's experiences in mineral oil return. If flammability (probably even "weak" flammability) can be tolerated, Caron et al.'s mixtures should be excellent refrigerants. DME boils at about −12.7° F. at one ATM (67.5° F. at 5 ATM), which is well below the typical crankcase temperatures, therefore, the DME will not become "trapped" in the crankcase oil and will circulate with the refrigerant where it will aid in the mineral oil return.

Also, some refrigerants such as R-413A R-218/134a/600a (9/88/3), contain a "perfluorocarbon" (R-218, octafluoropropane). Perfluorocarbons, while legal in refrigerants outside the US, are highly frowned upon by the US EPA due to their extremely long atmospheric lifetimes (thousands of years) and their very high global warming potentials, and consequently they are usually not approved for refrigerant use in the US.

SUMMARY OF THE INVENTION

One object of the present invention is to provide a solution for replacing R-22 refrigerant with a non stratospheric ozone depleting alternative.

Another object of the present invention is to provide a solution for replacing R-502 refrigerant with a non stratospheric ozone depleting alternative.

Another object of the present invention is to provide a solution for replacing R-404A refrigerant with an alternative that uses lower cost and more stable mineral oil.

Another object of the present invention is to provide a solution for replacing R-407C refrigerant with an alternative that uses lower cost and more stable mineral oil.

Another object of the present invention is to provide a solution for replacing R-417A refrigerant with an alternative that uses mineral oil in a wider variety of applications and provides much less loss of capacity than R-417A.

Another object of the present invention is to provide a solution for replacing R-12 refrigerant with a non stratospheric ozone depleting alternative.

Another object of the present invention is to provide a solution for replacing R-500 refrigerant with a non stratospheric ozone depleting alternative.

Another object of the present invention is to provide a solution for replacing R-134a refrigerant with an alternative that uses mineral oil in a wider variety of applications.

Another object of the present invention is to be compatible with lubricants and materials used in CFC and HCFC systems (mineral and alkylbenzene oil).

Another object of the present invention is to improve energy efficiency compared to R-22.

Another object of the present invention is to reduce the compressor discharge temperatures compared to R-22. This will allow higher compression ratios (lower suction pressures and thus colder temperatures) than R-22. R-22 has a very high heat of compression, which limits the maximum compression ratios due to the need to keep compressor discharge gas temperatures below about 300° F. to prevent breakdown of the refrigerant and oil. R-22 is typically limited to "medium" and "high" temperature (refrigeration and aircondtioning; not freezers) uses. R-22 is typically not used in "low temperature" (freezers) service unless some special technique such as multistage compression or injecting liquid refrigerant directly into the compressor inlet is employed to keep high discharge temperatures under control which result from the high compression ratios in low temperature service. R-502 was invented to address the high heat of compression problem of R-22. R-502 contains CFC-115 and is under the same phaseout schedule as is CFC-12.

Another object of the present invention is to be nonflammable, and to be able to pass a UL2182 flammability test to qualify for an ASHRAE designation of A1.

Among the most preferred embodiments of the present invention are mixtures of refrigerants that are substitutes for chlorodifluoromethane (R-22) refrigerant, comprising about 1 to 85 weight percent R-125, and about 1 to 80 weight percent R-134a, and about 0 to 12 weight percent of R-1270, R-290 or a mixture thereof, and about 1 to 15 weight percent R-E170 and about 0 to 20 weight percent R-227ea, with the weight percentages of the components being weight percentages of the overall mixture.

Other preferred embodiments of the present invention are mixtures of refrigerants that are substitutes for R-502 and R-404A refrigerants, comprising about 1 to 85 weight percent R-125, and about 1 to 80 weight percent R-134a, and about 0 to 12 weight percent of R-1270, R-290 or a mixture thereof, and about 1 to 15 weight percent R-E170 and about 0 to 20 weight percent R-227ea, with the weight percentages of the components being weight percentages of the overall mixture.

Other embodiments of the present invention are mixtures of refrigerants which are substitutes for R-12, R-134a, and R-500 refrigerants, comprising about 1 to 40 weight percent R-125, and about 1 to 90 weight percent R-134a, and about 0 to 12 weight percent of R-1270, R-290 or a mixture thereof, and about 1 to 15 weight percent R-E170 and about 0 to 20 weight percent R-227ea, with the weight percentages of the components being weight percentages of the overall mixture.

DESCRIPTION OF THE PREFERRED EMBODIMENTS

For the purposes of promoting an understanding of the principles of the invention, reference will now be made to the embodiments described below and specific language will be used to describe the same. It will nevertheless be understood that no limitation of the scope of the invention is thereby intended, such alterations and further modifications in the described embodiments, and such further applications of the principles of the invention as described therein being contemplated as would normally occur to one skilled in the art to which this invention relates.

Existing mixtures of R-134a and R-125 and a hydrocarbon to enable return of mineral oil to the compressor are limited to about 3% weight maximum of the hydrocarbon (or DME) component to still be nonflammable enough to receive an ASHRAE flammability classification of 1 and/or pass the UL2182 flammability test for refrigerants. The 3% maximum weight % of a hydrocarbon (or DME) component may return enough mineral for some applications, but it is not enough for all cases.

Applicant's novel solution to this problem is twofold. First, split up the flammable components as much as possible into the low and high boiling point ranges, near each end of the glide. Second, choose flammable components that are as close as possible in boiling points to the major nonflammable components (R-134a and R-125). Dimethyl Ether (DME), or R-E170, with a boiling point of −12.71° F. is very close to that of R-134a (bp−14.93° F.). Proplyene (R-1270), with a boiling point of −53.86° F. is very nearly aligned with the boiling point of the R-125 component (bp−54.65° F.). Applicant set the ratio of R125 $\mu$l 34a to establish a pressure temperature curve approximating R-22, which is roughly 56 weight percent R-125 and 44 weight percent R-134a. Next, Applicant replaced 6 weight percent of the R-125 with R-1270 and 4 weight percent of the R-134a with R-E170. This yielded R-1270/125/134a/E170 (Jun. 50, 1940/4) as a starting point. Applicant then confirmed the pressure temperature curve of this mixture in computer simulation with REFPROP. In the event that flammability is detected, a flammable component can be reduced or another nonflammable component (close in boiling point, R-227ea in the case of the R-E170) can be added in small amount in an attempt to inert the flammability.

After several months of testing, a contract safety engineering company began detailed flammability studying/testing of the mixture of Example 2 below under the UL2182 test procedures to allow Applicant to further refine the mixture to be able to pass the UL2182 as nonflammable. While the 5% weight of the propylene component had seemed to be nonflammable (in the mixture) at room temperature, the formal testing at the safety engineering company showed that upon heating to the required 212° F. under UL2182, the 5% propylene component became quite flammable, probably due to it's energetic double bond. Although, about 10F higher than the ideal boiling point, propane does not contain an energetic double bond. The 5% wt propylene component was replaced with 1.5% wt propane (R-125 adjusted upward to make 100%). This mixture, R-290/125/134a/227ea (1.5/53.5/35/4/5), did pass the "as formulated" portion of the UL2182 at 2120F at the safety engineering company. The propane component was further reduced from 1.5% to 1.0% to allow for some safety margin and testing continues. This mixture was used for Example 7, below, where mineral return properties were measured in an oil return test stand.

EXAMPLE 1

R-1270/125/134a/E170 (6/50/40/4) (GHG-X9A)

Four (4) pounds of the above mixture of refrigerants were made by weighing each component into a YellowJacket refrigerant-charging cylinder that had been evacuated to 100 microns of vacuum. The initial vacuum was sufficient to draw in the R-E170 component. The charging cylinder was next placed in an ice water bath and placed onto digital scales. The outer plexiglass cylinder containing the markings was removed, allowing the ice water to directly contact the aluminum charging cylinder. The R-134a component was added next, and due the ice water chilling of the charging cylinder, it readily flowed into the charging cylinder. R-1270 was added next and lastly the R-125 was added. After the components were added, the cylinder was shaken and rolled by hand to mix the components. A cylinder pressure of 135 PSIG at about 72° F. was noted.

The charging cylinder was allowed to set overnight to make sure it was stabilized. Next, a "vizi-vapr" charging device, made by Thermal Engineering Co, was evacuated and charged with about 20 ml of liquid refrigerant from the YellowJacket charging cylinder. A "quick and dirty" fractionation and flammability test was done by slowly vapor leaking out the 20 ml charge through a needle valve (over about a 20 minute period). A propane torch flame was moved about the area of the leaking vapor to see if it could sustain ignition when the torch flame was removed. This test is not designed to replace the UL2182 or ASTM E681 tests, but only to provide a quick indication of whether the mixture is close. There would be no point in doing the UL2182 test if flammability is detected in the "quick and dirty" method. This sample did sustain ignition (barely), both at the very beginning of the leakdown, and at the very end of the leakdown, but would not sustain ignition during the middle portion of the leakdown.

EXAMPLE 2

A Preferred Embodiment

R-1270/125/134a/E170/227ea (5/51/35/4/5) (GHG-X9B)

Due to the detected flammability of the mixture of Example 1, the mixture was modified by reducing the R-1270 by 1 weight percent (increase R-125 1 weight percent), and 5 weight percent of R-227ea (5 wt % R-134a removed) was added to inert the flammability near the tail end of the fractionation, thus yielding the mixture of Example 2.

Using the procedure set forth in Example 1, the components were weighed into an evacuated YellowJacket charging cylinder in an icewater bath in the following order: R-227ea, R-E170, R-134a, R-1270, R-125. Cylinder shaken and rolled, and allowed to stabilize overnight. The fractionation test of Example 1 was repeated on the mixture of Example 2. Ignition did not sustain during the entire leakdown. This mixture is now "nonflammable enough" to proceed to further testing, such as the full UL2182 flammability testing procedure to be conducted by licensed professional engineers. Should regions of flammability be identified, some steps that can be taken are to:

1) reduce the R-1270 by 0.5 or 1.0 weight percent and replace it with R-290 (propane), which boils at about −43° F. instead of about −54° F., thus moving the leakout of the initial flammables inward from the initial edge of the fractionation towards the center of the fractionation which showed to be more solidly nonflammable.
2) If a problem at the end of fractionation, add 1 or 2 weight percent more R-227ea (reduce R-134a by this amount).
3) Reduce flammable components slightly and increase nearby (in boiling point) components by same amount.
4) Possibly add 1 or 2 weight percent cyclopropane (R-C270), since it boils at −27° F., in the center of the glide. It is Applicant's understanding that while R-C270 was once widely used for anesthesia, it is no longer available at low enough prices to make a commercial refrigerant.

Applicant obtained a Frigidaire window air conditioner, model FAC103J1A1, 120V 60 Hz, 9950 BTU/H. Applicant recovered the factory R-22 charge and it weighed 1.15 lb. Applicant then added Shraeder access valves to both low and high sides, along with refrigerant sight glasses in both low and high sides (liquid line).

Then, Applicant evacuated the system, and charged it with R-22 to obtain base line data, followed by evacuation and charging with about 1.1 lbs of the mixture of Example 2.

|  | R-22 | Example 2 |
|---|---|---|
| Compressor AMPS | 9.6 | 8.9 |
| Suction pressure PSIG | 67 | 59 |
| Head pressure PSIG | 249 | 252 |
| Compressor discharge ° F. | 161.6 | 140.4 |
| Evaporator in air ° F. | 76.0 | 76.0 |
| Evaporator out air ° F. | 56.2 | 56.6 |
| Condenser in air ° F. | 88.0 | 86.2 |
| Condenser out air ° F. | 116.2 | 120.2 |

Comparing the amount of cooling, the delta T across the evaporator, it was noted that R-22 produced a 19.8° F. temperature drop, while using 9.6 AMPS on the compressor, while the Example 2 mixture produced a 19.4° F. temperature drop, while using 8.9 AMPS on the compressor, which represents a 2% reduction in cooling and a 7.2% reduction in AMP draw, yielding a net efficiency increase. Of course, this may not have been the optimal charge of the Example 2 mixture for this unit.

The suction pressure was lower with the Example 2 mixture, as was, notably, the compressor discharge temperature reduction of about 21° F. R-22 is noted for it's high "heat of compression," which has now been greatly reduced by using the Example 2 mixture. The lower heat of compression may allow the Example 2 mixture to be used in freezers and other low temperature equipment where R-22 was prohibited due to its high heat of compression.

EXAMPLE 3

R-290/125/134a/E170/227ea (3/75/16/2/4)

A computer simulation with REFPROP V5.1 indicated that the mixture of Example 3 would be a good match to replace R-502 refrigerant.

|  | R-502 (dew/bubble PSIA) | Example 3 (dew/bubble PSIA) |
|---|---|---|
| Temp ° F. −20 | 30.03/30.06 | 26.29/31.41 |
| 0 | 45.67/45.69 | 41.29/47.92 |
| 70 | 152.2/152.2 | 149.2/161.5 |
| 130 | 339.7/339.8 | 349.5/363.4 |

The REFPROP estimated critical temperature for the Example 3 mixture is 183° F. versus the known critical temperature for R-502 of 177.3° F. R-502 is considered an azeotrope, with the dew and bubble points being essentially the same and therefore for practical purposes it can be considered a single fluid. All the mixtures of the present invention are zeotropes and therefore have differing dew and bubble points. As the data above shows, Example 3 pressures are close enough to replace R-502 in most instances. The −20° F. (low temp evaporator), 0° F. (medium temp evaporator), and 70° F. (condensing temp on a cool day) of Example 3 pressures all bracket the R-502 pressures. The 130° F. (extreme hot day condensing temp), shows Example 3 at slightly higher condensing pressures than R-502 (about 5% higher), well within system operating limits. Subtract 14.7 from the above PSIA pressures to yield gauge (PSIG) pressures.

EXAMPLE 4

R-1270/125/134a/E170 (2/54/42/2)

A computer simulation with REFPROP V5.1 indicates that the mixture of Example 4 may be useful as a "low cost" alternative to the Example 2 mixture, for use in systems where returning mineral oil to the compressor is not difficult (such as new manufacture of window air conditioners). Mineral oil only needs to be returned about 6 inches maximum to the compressor from the evaporator. This mixture contains no expensive R-227ea and should return mineral oil just as good as or slightly better than R-417A and other R-22 alternatives comprised of HFCs and only about 3 weight percent of a hydrocarbon. Unlike R-417A, which has about 25–30 percent reduced capacity compared to R-22, mixtures of Example 4 and Example 2 should nearly match the capacity of R-22, with a slight reduction in compressor energy use. The mixture of Example 4 would not be recommended for use in system with long refrigerant lines nor for use with rooftop units.

EXAMPLE 5

R-290/125/134a/E170/227ea (1/8/82/04/05)

A computer simulation with RERPROP V5.1 indicates that the mixture of Example 5 would be a close match to replace R-134a, R-12, or R-500 refrigerants, although the pressures may be about 5–10 percent higher than R-12, it should still work in most cases and provide some increase in capacity. This is especially useful in automotive air conditioning. This Example may also be useful in the manufacture of refrigerators, freezers and dehumidifiers were it may be less expensive to use this Example 5 refrigerant and mineral oil than to use R-134a and a more expensive (and less stable) POE oil.

|  |  | R-134a (dew/bubble PSIA) | Example 5 (dew/bubble PSIA) |
|---|---|---|---|
| Temp° F. | 0 | 21.16/21.16 | 22.65/27.15 |
|  | 32 | 42.45/42.45 | 45.06/51.4 |
|  | 70 | 85.79/85.79 | 90.58/99.22 |
|  | 130 | 213.4/213.4 | 224.9/227.9 |

The REFPROP estimated critical temperature for the Example 5 mixture is 227.9° F., which is quite an improvement over the known critical temperature of 213.4° F. for R-134a.

EXAMPLE 6

An existing 2.5 ton R-22 home central airconditioning split system (220 volts) was charged with 6.3 pounds of the mixture of Example 2 after taking baseline measurements from the system operating with R-22 refrigerant. The ductwork on this system (homeowner installed) was not yet insulated in unconditioned spaces such as the crawl space and the garage. This is why the temperature drop from return duct to supply register is only about 10° F. instead of the usual 18 to 20° F. drop across the evaporator. Nearly one half of the airconditioning effect is being wasted in the uninsulated ductwork. This is an older unit with the condenser "undersized" compared to modern units.

|  | R-22 | Example 2 |
| --- | --- | --- |
| Compressor + condenser fan AMPS | 18.8 | 17.9 |
| Suction pressure PSIG | 75 | 71.5 |
| Head pressure PSIG | 310 | 332 |
| Evaporator in air (return duct) ° F. | 73.4 | 73.3 |
| Evaporator out air (supply register) ° F. | 62.6 | 63.0 |
| Condenser in air ° F. | 83.0 | 83.2 |
| Condenser out air ° F. | 120.0 | 119.4 |
| Suction line temp ° F. | 57.6 | 53.6 |
| Liquid line temp ° F. | 104.6 | 88.0 |

The Example 2 mixture used in Example 6 shows a 4.6 percent drop in refrigeration capacity along with a 4.8 percent drop in condensing unit amperage draw compared to R-22, thus yielding a small increase in efficiency.

EXAMPLE 7

A Most Preferred Embodiment

R-290/125/134a/E170/227ea (1/54/35/4/5)
(GHG-X9C)

In light of the information on flammability data obtained from the safety engineering company's testing of the mixture of Example 2 under the UL2182 procedures, the above mixture of Example 7 was derived. The 5 weight percent of R-1270 was changed to 1 weight percent of R-290. The weight of the R-125 component was increased by 4 percent to make the total 100 percent, yielding the mixture of Example 7, above.

Using the procedure set forth in Example 1, with the following changes, 25 pounds of the Example 7 mixture was made. A standard "30 pound" steel refrigerant recovery cylinder was used instead of a smaller "dial-a-charge" cylinder. The ice water bath was not used and the 30 pound (evacuated) cylinder was first prechilled by soaking the bottom half in liquid nitrogen for about 30 seconds, and again soaking the cylinder in liquid nitrogen for about 30 seconds before the addition of the R-134a component.

A test stand was constructed to measure mineral oil return in an actual operating system. This system is a standard commercial 5-Ton "split system" heat pump with some modifications. For the purposes of this Example, only the airconditioning mode will be used. The heat exchanger in the inside unit can therefore be referred to as the evaporator, and the outside heat exchanger will be the condenser (condensing unit).

The condensing unit is rated at SEER 12 and contains a Copeland Scroll compressor, model ZR61KC-PFV, 208–230 Volts, 60 Hertz, single phase and was precharged with 56 fluid ounces of "mineral oil" plus about 10 pounds of R-22 refrigerant charge. A thermocouple was attached to the compressor discharge port for measuring discharge gas temperature. The electrical lead connected to the "common" terminal was looped outside of the enclosure to allow for easy attachment of a clamp-on ammeter for measuring compressor current draw.

The refrigerant piping connecting the condensing unit to the evaporator was sized to industry standard practices for a 5-Ton unit according to the "Piping Handbook, Seventh Edition", edited by Mohinder L. Nayyar, PE, McGraw-Hill ISBN 0-07-047106-1, page C.484. This meant the liquid line was sized at ½ inch (outside) diameter and the suction line was 1⅛ inches (outside) diameter. The condensing unit was located about 10 feet away from the evaporator (inside unit). The air handler unit had a specially constructed sheet metal "slider" that could be pushed into the ductwork just at the evaporator air outlet to allow the operator to modulate air flow through the evaporator from full flow down to almost nil, thus simulating different heat loadings on the evaporator.

At the point where the ½ inch "liquid line" entered the evaporator air handler unit, a packless manual liquid line hand valve was added to allow for manual reduction of liquid refrigerant flow into the evaporator. The evaporator unit contained a nonadjustable expansion valve (TXV) made for R-22 refrigerant. The 1⅛ inch suction line left the evaporator horizontally, passed through a Sporlan sight glass (to observe oil return and any liquid refrigerant in the suction line). After a five foot horizontal run, the suction line dropped vertically down for about 2.5 feet to the ground and then traveled horizontally for about 1.5 feet (contains a sight glass for oil observation) to form a "trap" or the low spot in the system before ascending vertically for 25 feet. The 25 foot vertical rise simulated the condensing unit being placed on the roof and made for a difficult path for oil return. Other than the single low spot (trap), there were no "oil traps" in the 25 foot vertical rise of the suction line. At the top of the 25 foot rise, the suction line went horizontal for 1.5 feet and then dropped vertically for 24 feet and then horizontally returned to the condensing unit. Just before entering the condensing unit, a ball valve was inserted into the suction line. This ball valve is the primary method for reducing the suction gas flow (and thus it's velocity). It simulates the unloaders found in many commercial systems. The suction line is insulated where ever possible with the standard one half inch thick standard foam pipe wrap used in the trade.

A Dwyer Instruments model IF2713 industrial flow meter was installed in the upward leg of the suction line about 6 feet above ground level. A pair of 1⅛ inch ball valves were located immediately above and below the flow meter to allow it to be valved out of the refrigerant circuit. A short 1⅛ inch bypass line, also containing a ball valve, was teed in to the vertical refrigerant suction line immediately above and below the pair of ball valves used to isolate the flow meter. The valves above and below the flow meter could be closed and the bypass valve opened to allow operation without the flow meter. The flow meter itself consisted of a vertical borosilicate tapered glass tube containing a metal vertical rod on which rode a metal "bullet" (nose of the bullet faces downward). The diameter of the bottom of the glass tube was about 1⅛ inches in diameter while the top was slightly larger at about 1½ inches in diameter. The gas flow caused the bullet to rise up the rod depending on the mass flow of the gas. There was a calibrated scale in SCFM (for air and water) etched on the outside of the glass. The flow rate was read from where the flat end (back) of the bullet pointed on the etched scale on the glass. The glass was rated at 200 PSIG, which was suitable for operation in airconditioning mode. The flow meter MUST have been valved out of the circuit if the system was to be operated in heatpump mode, since the suction line becomes the "hot gas" (compressor discharge gas) line and the pressure may exceed the rated 200 PSIG. The flow meter glass tube was enclosed in an "explosion" safety shield made of polycarbonate for operator protection.

R-22 has only mediocre miscibility in mineral oil. Miscibility of R-22 in mineral oil improves with temperature. Early (circa 1950–1960s) R-22 based airconditioning and refrigeration systems with long and/or vertical piping runs often suffered compressor failures due to lack of oil. The mineral oil would sometimes become trapped in the long lines and the compressor would become oil starved and fail. R-22 systems of that era were designed with the larger suction line piping sizes found on R-12 systems. R-12 is very miscible in mineral oil and would have no problems returning mineral oil in the lower suction gas velocities in larger diameter suction lines. The lower suction gas velocities due to larger suction line diameters would sometimes cause R-22 systems to fail to properly return mineral oil. The solution was simple: downsize the suction lines in R-22 systems to increase the suction gas velocity, which enabled the mediocre mineral oil miscibility (of R-22) to "drag" the oil back. When inventing replacements for R-22, attention must be paid to how they return mineral oil as a function of suction gas velocity (which is directly proportional to the flow rate as measured with a flow meter) in order to discover their limitations.

Reducing the gas flow through a hermetic scroll compressor, which depends on refrigerant gas flow to cool the motor windings, will quickly cause the motor to overheat and will cause the thermal overload motor protector to open and shutdown the compressor. Also, lowering the suction gas pressure at the compressor inlet will increase the compression ratio which will greatly increase the compressor output (discharge) temperature, possibly to over 300° F. where refrigerant and oil breakdown begins. Both of these problems are solved by injecting a small amount of liquid refrigerant directly into the compressor inlet while running at reduced suction gas flows.

This particular condensing unit had a service port with a standard schraeder valve that leads directly to the compressor inlet. A standard refrigeration service manifold (gauge and hoses set) was connected between the service port attached to the liquid line (near the evaporator refrigerant inlet) and the compressor inlet service port. The manifold valves were opened until the liquid pressure read 80–100 PSIG. The schraeder valve on the compressor service port limited the liquid flow with the actual compressor inlet being near 0–10 PSIG. This direct liquid injection caused the compressor inlet pipe to ice over, however, it keeps the discharge gas safely below 150° F. and allows continuous compressor operation with little or no suction gas flow in the regular suction line.

The oil return test stand operating procedure was as follows:

1) Evacuate the system into 1000 micron vacuum or better.

2) Liquid charge about 8 pounds of refrigerant under test into the high side (liquid line) to break the vacuum.

3) Start system in operation, with evaporator air-flow restrictor (slider) removed.

4) Add more refrigerant (charging as liquid from the refrigerant cylinder) into the suction line until the liquid line site glass (just ahead of the TXV) shows no bubbles. This is about 14 to 15 pounds of charge.

5) If flood back was occurring (some liquid leaving the evaporator and showing up in the flow meter), then further restrict the flow using the manual liquid line valve installed just ahead of the non adjustable TXV until the flood back is gone.

6) Run system for at least 30 minutes to stabilize, with ambient temperatures of about 75–80° F. The "indicated" SCFM (standard cubic feet/minute) was read from the flow meter and recorded. Since these comparisons are relative to R-22, "indicated" SCFM readings were used for simplicity. If needed, actual (real) mass flows and velocities can be calculated from the indicated SCFM readings. This is the maximum SCFM for this refrigerant.

Actual SCFM=Indicated SCFM×(Density of refrigerant vapor/Density of air)

Given the suction line (inside diameter), actual SCFM, and the refrigerant vapor density, the suction line velocity can be calculated if needed.

7) Measure the minimum indicated SCFM needed to carry mineral up the suction line. The manifold controlling the liquid injection is opened, such that there is around 80 PSIG of liquid at the scraeder valve leading to the compressor inlet. Monitor compressor discharge temperature and adjust the liquid injection such that a compressor discharge gas temperature is between 130 to 160° F. Next, partially close the ball valve in the suction line nearest the compressor to reduce the suction gas flow to about ½ of the reading in step 6. Push in the metal slider to reduce the air flow over the evaporator to about ½. Let system run for about 5 minutes, then finagle the evaporator air restrictor while monitoring the suction line temperature just below the flow meter until the suction line reads about 45° F. Observe for oil flow creeping up the inside walls of the flow meter. One may need to run system for 30 minutes or more for the oil flow to establish. If oil flow is observed creeping up the flow meter and out the top, then reduce suction gas flow further and air flow further (to maintain 45° F.) suction line temperature. If no oil flow after a couple of hours, then increase suction gas flow a little by opening the ball valve slightly and increasing air flow to maintain 45° F. suction temperature. Repeat making small changes in suction gas and air flow until the minimum SCFM is found that just barely moves the oil. At this point, oil will just barely creep up into the bottom of the flow meter and build up a "ring" of oil in the top half of the flow meter. Since the flow meter glass tube is slightly larger on the top (gas velocity will be slightly less in the top part of the flow meter), the oil will be unable to exit the flow meter. This is the minimum oil carrying indicated SCFM. This process is painstaking and it often takes a day or more to find the minimum SCFM.

| Refrig | Max indicated SCFM | Min indicated SCFM to carry oil | Suction Temp ° F. |
| --- | --- | --- | --- |
| R-22 | 44 | 16 | 45 |
| RS-44 | 43 | 24 | 45 |
| Example 7 | 44 | 14 | 45 |

Both RS-44 and Example 7 blends exhibited a small amount of liquid refrigerant "flood back" in the suction line due to them "fooling" the nonadjustable TXV. The manual liquid line valve just ahead of the TXV was used to reduce the refrigerant metered into the evaporator to eliminate the liquid flood back. This is a common effect of zeotropic blend refrigerants. If real systems out in the field were switched from R-22 to either RS-44 or Example 7 and they had a nonadjustable TXV, the TXV may have to be changed out for an adjustable TXV.

Also, higher suction line temperatures make R-22 more miscible in mineral oil and thus make it easier to carry mineral oil. Mixtures of the present invention as well as RS-44 are comprised of HFC-125 and HFC-134a to provide the bulk of the refrigeration effect plus small amounts of (flammable) agents for mineral oil return. HFCs 125 and 134a have ZERO miscibility in mineral oil, where as the miscibility agents in the present invention (DME and HCs) and RS-44 (HCs) are nearly 100 percent miscible in mineral oil. Thus an effect worth noting for both the present invention as well as other's inventions (e.g. RS-44, etc) is that there is very little change in the mineral oil miscibility verses the suction line temperature compared to the effect where increasing suction line temperature improves mineral oil miscibility for R-22. Running both RS-44 and Example 7 mixtures above with higher and lower suction line temperatures (35° F. thru about 60° F.) showed almost no change in mineral return characteristics.

Example 7 was able to carry mineral oil at a slightly lower suction gas velocity than R-22 (14 vs 16), but they were so close that they are essentially the same. On the other hand, RS-44 lost mineral oil return at a much higher (about 50% higher) suction gas velocity than did both R-22 and Example 7. If RS-44 was used in R-22 equipment "when unloaded" (reducing suction gas velocity to ½ of maximum) for extended periods of time, one would expect to see mineral oil return problems with RS-44 but not with the Example 7 mixture. At full suction gas flows, both RS-44 and Example 7 mixtures would offer mineral oil return in most systems and similar refrigeration effect.

EXAMPLE 8

R-1270/290/125/134a/E170 (1/1/54/42/2)

Similar to Example 4, except the hydrocarbon component is now split up between propane and propylene. This Example should be functionally equivalent to the mixture of Example 4. While it does not have the "best" possible mineral oil return of this invention, as does Example 7, it should be "adequate" for most uses to replace R- 22 where the extreme limits of mineral oil return are not encountered (e.g. a long suction line leading uphill to a rooftop condensing unit). REFPROP V5.1 simulation yields:

| Temp ° F. | R-22 (dew/bubble PSIA) | Example 8 | Example 7 (for comparison) |
|---|---|---|---|
| 0 | 38.73/38.73 | 32.87/40.97 | 31.66/39.57 |
| 32 | 72.23/72.23 | 63.79/75.41 | 61.46/73.10 |
| 70 | 136.1/136.1 | 125.1/141.0 | 120.6/137.1 |
| 130 | 311.6/311.6 | 301.6/321.4 | 291.4/313.1 |

REFPROP simulation yields a critical temperature of 199.5° F. for Example 8, (Example 7 critical temperature was simulated to be 202.8° F.) versus a known critical temperature of 205.07° F. for R-22. The Example 8 (and Example 7) critical temperatures are very close to that of R-22. The pressure temperature curves (bubble and dew points) for Example 8 (and also for Example 7) nicely bracket the pressure temperature curve of R-22 from 0° F. thru 130° F., the most common range of operation for R-22.

Since both water and mineral oil are soluble in R-E170, there might be a drawback to the present invention where slight amounts of moisture already present in a system, in the order of 50 ppm or less, that would not cause much damage (halocarbons slowly hydrolyzing into acids), but the R-E170 may hold this insoluble moisture in better contact with the halocarbon molecules, thus speeding up the undesirable hydrolysis reactions. The addition of a small amount of Cryo-Chem SSO2A "Dry-Pak" at the rate of 1 to 6 ml per pound to the mixtures of this invention will react with any residual moisture and convert it onto harmless silicone oil, thus stopping the hydrolysis of the halocarbons and acid formation due to residual moisture. SSO2A is disclosed in U.S. Pat. No. 4,508,631 to Packo et al. Addition of SSO2A has been noted to improve the performance of other refrigerants, often providing 5 to 8° F. colder air in automotive airconditioning systems (R-134a).

SSO2A has been incorporated into GHG-X8 refrigerant (Cooltop) R-125/152a/134a (35/25/40), a performance increasing substitute for R-134a in automotive applications, disclosed in U.S. Pat. No. 6,056,891 to Goble. Existing R-134a automotive applications using POE (ester) or PAG oils, often have large amounts of moisture present, which leads to early failures. New PAG oil obtained from vendors often contains 800–1000 ppm moisture (AR1700 standard for refrigerants is 10 ppm). Systems have been charged with GHG-X8 (including Dry-Pak) that included PAG oil at over 800 ppm moisture and said systems have not suffered moisture damage for several years now. Without the Dry-Pak, said systems would have failed in 6 months to 1 year from acid damage from that amount of moisture.

Some other working fluids, while not currently in large volume production, could be used to replace the expensive R-227ea component, if they ever become commercially available at sufficiently low prices. These are:

| R-number | boil pt | name |
|---|---|---|
| R-E134a | −4.0° F. | difluoromethoxytrifluoromethane |
| R-245cb | −0.5° F. | 1,1,1,2,2-pentafluoropropane |
| R-CE216ca12 | −7.8° F. | hexafluorodioxetane |
| R-134 | −3.5° F. | 1,1,2,2-tetrafluoroethane (not to be confused with R-134a which is massively produced at this moment) |

I claim:

1. A mixture of refrigerants that is a substitute for dichlorodifluoromethane, 1,1,1,2-tetrafluoroethane and R-500 (73.8 weight percent dichlorodifluoromethane and 26.2 weight percent 1,1-difluoroethane) refrigerants, comprising about 3 to 20 weight percent pentafluoroethane; and about 55 to 96 weight percent 1,1,1,2-tetrafluoroethane; and about 0.5 to 4 weight percent propane; and about 0.5 to 7 weight percent dimethyl ether (DME); and about 0 to 12 weight percent 1,1,1,2,3,3,3-heptafluoropropane, with the weight percentages of the components of the mixture being weight percentages of the overall mixture.

2. The mixture of refrigerants of claim 1, wherein pentafluoroethane is present in about 8 weight percent; 1,1,1,2-tetrafluoroethane is present in about 82 weight percent; propane is present in about 1 weight percent; dimethyl ether (DME) is present in about 4 weight percent; and 1,1,1,2,3,3,3-heptafluoropropane is present in about 5 weight percent.

3. A method for producing refrigeration in a refrigeration system designed for dichlorodifluoromethane, 1,1,1,2-tetrafluoroethane and R-500 (73.8 weight percent dichlorodifluoromethane and 26.2 weight percent 1,1-difluoroethane) refrigerants, comprising substituting for said refrigerants a mixture of about 3 to 20 weight percent pentafluoroethane; and about 55 to 96 weight percent 1,1,1,2-tetrafluoroethane; and about 0.5 to 4 weight percent propane; and about 0.5 to 7 weight percent dimethyl ether (DME); and about 0 to 12 weight percent 1,1,1,2,3,3,3-heptafluoropropane, with the weight percentages of the components of the mixture being weight percentages of the overall mixture.

4. The method of claim 3 wherein said substituting step consists of substituting a mixture wherein pentafluoroethane is present in about 8 weight percent; 1,1,1,2-tetrafluoroethane is present in about 82 weight percent; propane is present in about 1 weight percent; dimethyl ether (DME) is present in about 4 weight percent; and 1,1,1,2,3,3,3-heptafluoropropane is present in about 5 weight percent.

* * * * *